(12) United States Patent
Jin et al.

(10) Patent No.: US 10,627,951 B2
(45) Date of Patent: Apr. 21, 2020

(54) TOUCH-PRESSURE SENSITIVITY CORRECTION METHOD AND COMPUTER-READABLE RECORDING MEDIUM

(71) Applicant: HiDeep Inc., Gyeonggi-do (KR)

(72) Inventors: Myung Jun Jin, Gyeonggi-do (KR); Bong Jin Seo, Gyeonggi-do (KR); Bon Kee Kim, Gyeonggi-do (KR)

(73) Assignee: HIDEEP INC. (KR)

( * ) Notice: Subject to any disclaimer, the term of this patent is extended or adjusted under 35 U.S.C. 154(b) by 0 days.

(21) Appl. No.: 16/074,676

(22) PCT Filed: Feb. 2, 2017

(86) PCT No.: PCT/KR2017/001148
§ 371 (c)(1),
(2) Date: Aug. 1, 2018

(87) PCT Pub. No.: WO2017/135707
PCT Pub. Date: Aug. 10, 2017

(65) Prior Publication Data
US 2019/0042050 A1 Feb. 7, 2019

(30) Foreign Application Priority Data
Feb. 5, 2016 (KR) .................. 10-2016-0014740

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0418* (2013.01); *G06F 2203/04105* (2013.01)

(58) Field of Classification Search
CPC ....... G06F 3/0416; G06F 3/0418; G06F 3/044

USPC .................... 178/18.01–19.07; 345/173–178
See application file for complete search history.

(56) References Cited

U.S. PATENT DOCUMENTS

| 2013/0082973 A1 | 4/2013 | Wurzel et al. |
| 2015/0049064 A1 | 2/2015 | Shin |
| 2018/0088721 A1* | 3/2018 | Moon .................. G06F 3/044 |

FOREIGN PATENT DOCUMENTS

| JP | 2012-103995 | 5/2012 |
| KR | 10-20110134155 | 12/2011 |
| KR | 10-20130060716 | 6/2013 |

(Continued)

OTHER PUBLICATIONS

Corresponding International Search Report for Application No. PCT/KR2017/001148 dated May 23, 2017.

*Primary Examiner* — Michael Pervan
(74) *Attorney, Agent, or Firm* — The Belles Group, P.C.

(57) ABSTRACT

A method for correcting a touch pressure sensitivity may be provided that includes: a modeling profile data generation step of generating modeling profile data on the basis of a plurality of collected profile data; and a set profile data generation step of generating set profile data on the basis of the modeling profile data and a reference data of a predetermined touch input device. As a result, it is possible to correct the touch pressure sensitivity of a predetermined touch input device such that the touch pressure is sensed with a uniform sensitivity on the entire display surface of the touch input device.

9 Claims, 9 Drawing Sheets

DIVIDE DISPLAY SURFACE OF THE PREDETERMINED TOUCH SENSOR PANEL INTO A PLURALITY OF PREDEFINED AREAS — S810

GENERATE SET PROFILE DATA FOR EACH OF THE PLURALITY OF DIVIDED AREAS IN DIFFERENT WAYS — S830

(56) References Cited

FOREIGN PATENT DOCUMENTS

| KR | 10-20140068257 | 6/2014 |
| KR | 10-20150020774 | 2/2015 |

* cited by examiner

TOUCH-PRESSURE SENSITIVITY CORRECTION METHOD AND COMPUTER-READABLE RECORDING MEDIUM

CROSS-REFERENCE TO RELATED PATENT APPLICATIONS

The present application is a U.S. national stage application under 35 U.S.C. § 371 of PCT Application No. PCT/KR2017/001148, filed Feb. 2, 2017, which claims priority to Korean Patent Application No. 10-2016-0014740, filed Feb. 5, 2016. The disclosures of the aforementioned priority applications are incorporated herein by reference in their entireties.

FIELD

The present disclosure relates to a touch pressure sensitivity correction method and a computer-readable recording medium.

BACKGROUND

Field

The present disclosure relates to a touch pressure sensitivity correction method and a computer-readable recording medium.

Description of the Related Art

Various kinds of input devices for operating a computing system, for example, a button, key, joystick and touch screen, etc., are being developed and used. The touch screen has a variety of advantages, e.g., ease of operation, miniaturization of products and simplification of the manufacturing process, the most attention is paid to the touch screen.

The touch screen may constitute a touch surface of a touch input device including a touch sensor panel which may be a transparent panel including a touch-sensitive surface. The touch sensor panel is attached to the front side of the touch screen, and then the touch-sensitive surface may cover the touch screen. The touch screen allows a user to operate the computing system by touching the touch screen with his/her finger, etc. Accordingly, the computing system recognizes whether or not the touch has occurred on the touch screen and a touch position on the touch screen and performs arithmetic operations, thereby performing actions according to the user's intention.

Meanwhile, there is a requirement for a device for sensing even the touch pressure for convenience of operation and a research on the device is being conducted. However, in the sensing of the touch pressure, there is a problem that the touch pressure cannot be sensed with a uniform sensitivity on the display surface. Furthermore, due to the difference in the manufacturing process or manufacturing environment, different sensitivities may be shown for each manufactured product. For the purpose of correcting this, therefore, the touch input device needs to correct the sensitivity.

SUMMARY

One embodiment is a method for correcting a touch pressure sensitivity that includes: a modeling profile data generation step of generating modeling profile data on the basis of a plurality of collected profile data; and a set profile data generation step of generating set profile data on the basis of the modeling profile data and a reference data of a predetermined touch input device.

A computer-readable recording medium according to the embodiment of the present invention can record programs for executing the above-described method for correcting the touch pressure sensitivity.

DETAILED DESCRIPTION

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Figure 1:
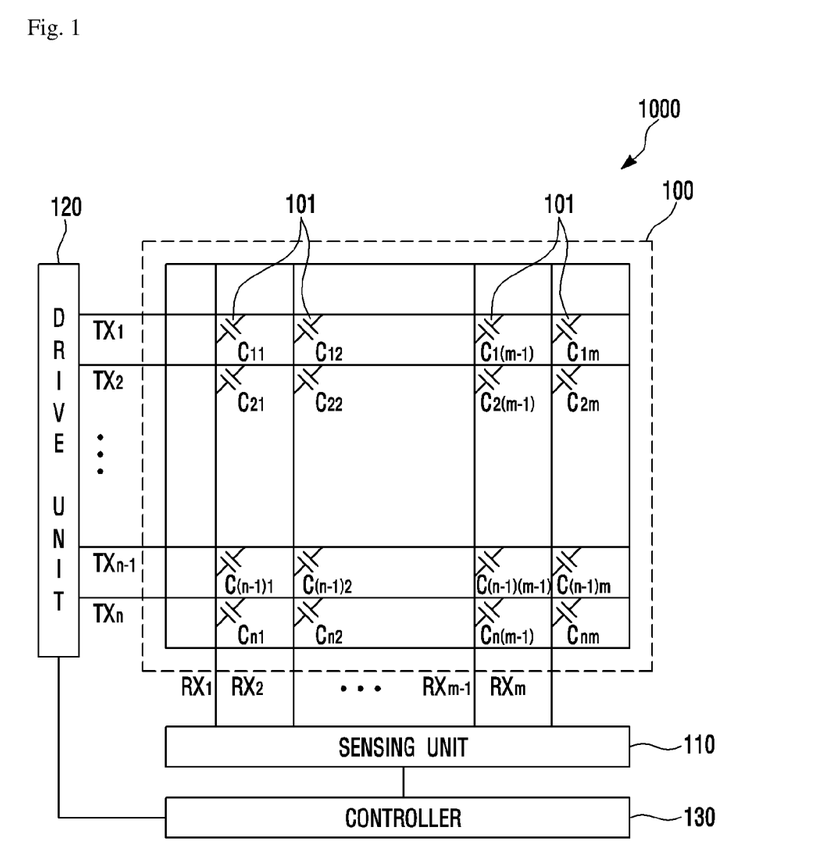
FIG. 1 is a schematic view showing a configuration of a touch input device to which a touch pressure sensitivity correction method of an embodiment of the present invention is applied.

FIG. 1 is a schematic view showing a configuration of a touch input device to which a touch pressure sensitivity correction method of an embodiment of the present invention is applied.

Referring to FIG. 1, a touch sensor panel 100 according to the embodiment of the present invention may include a plurality of drive electrodes TX1 to TXn and a plurality of receiving electrodes RX1 to RXm. The touch sensor panel 100 may include a drive unit 120 which applies a drive signal to the plurality of drive electrodes TX1 to TXn for the purpose of the operation of the touch sensor panel 100, and a sensing unit 110 which detects whether the touch has occurred or not and a touch position by receiving a sensing signal including information on the capacitance change amount changing according to the touch on the touch surface of the touch sensor panel 100.

As shown in FIG. 1, the touch sensor panel 100 may include the plurality of drive electrodes TX1 to TXn and the plurality of receiving electrodes RX1 to RXm. While FIG. 1 shows that the plurality of drive electrodes TX1 to TXn and the plurality of receiving electrodes RX1 to RXm of the touch sensor panel 100 form an orthogonal array, the present invention is not limited to this. The plurality of drive electrodes TX1 to TXn and the plurality of receiving electrodes RX1 to RXm has an array of arbitrary dimension, for example, a diagonal array, a concentric array, a 3-dimensional random array, etc., and an array obtained by the application of them. Here, "n" and "m" are positive integers and may be the same as each other or may have different values. The magnitudes of the values may be different from each other.

As shown in FIG. 1, the plurality of drive electrodes TX1 to TXn and the plurality of receiving electrodes RX1 to RXm may be arranged to cross each other. The drive electrode TX may include the plurality of drive electrodes TX1 to TXn extending in a first axial direction. The receiving electrode RX may include the plurality of receiving electrodes RX1 to RXm extending in a second axial direction crossing the first axial direction.

In the touch sensor panel 100 according to the embodiment which is one component of the embodiment of the present invention, the plurality of drive electrodes TX1 to TXn and the plurality of receiving electrodes RX1 to RXm may be formed in the same layer. For example, the plurality of drive electrodes TX1 to TXn and the plurality of receiving electrodes RX1 to RXm may be formed on the same side of an insulation layer (not shown). Also, the plurality of drive electrodes TX1 to TXn and the plurality of receiving electrodes RX1 to RXm may be formed in different layers. For example, the plurality of drive electrodes TX1 to TXn and the plurality of receiving electrodes RX1 to RXm may be formed on both sides of one insulation layer (not shown) respectively, or the plurality of drive electrodes TX1 to TXn may be formed on a side of a first insulation layer (not shown) and the plurality of receiving electrodes RX1 to RXm may be formed on a side of a second insulation layer (not shown) different from the first insulation layer.

The plurality of drive electrodes TX1 to TXn and the plurality of receiving electrodes RX1 to RXm may be made of a transparent conductive material (for example, indium tin oxide (ITO) or antimony tin oxide (ATO) which is made of tin oxide ($SnO_2$), and indium oxide ($In_2O_3$), etc.), or the like. However, this is only an example. The drive electrode TX and the receiving electrode RX may be also made of another transparent conductive material or an opaque conductive material. For instance, the drive electrode TX and the receiving electrode RX may include at least any one of silver ink, copper, and carbon nanotube (CNT). Also, the drive electrode TX and the receiving electrode RX may be made of metal mesh or nano silver.

The drive unit 120 which is one component of the touch input device 1000 to which the touch pressure sensitivity correction method according to the embodiment is applied may apply a drive signal to the drive electrodes TX1 to TXn. In the touch input device 1000 to which the touch pressure sensitivity correction method according to the embodiment is applied, one drive signal may be sequentially applied at a time to the first drive electrode TX1 to the n-th drive electrode TXn. The drive signal may be applied again repeatedly. This is only an example. The drive signal may be applied to the plurality of drive electrodes at the same time in accordance with the embodiment.

Through the receiving electrodes RX1 to RXm, the sensing unit 110 receives the sensing signal including information on a capacitance (Cm) 101 generated between the receiving electrodes RX1 to RXm and the drive electrodes TX1 to TXn to which the drive signal has been applied, thereby detecting whether or not the touch has occurred and the touch position. For example, the sensing signal may be a signal coupled by the capacitance (Cm) 101 generated between the receiving electrode RX and the drive electrode TX to which the drive signal has been applied.

As such, the process of sensing the drive signal applied from the first drive electrode TX1 to the n-th drive electrode TXn through the receiving electrodes RX1 to RXm can be referred to as a process of scanning the touch sensor panel 100.

For example, the sensing unit 110 may include a receiver (not shown) which is connected to each of the receiving electrodes RX1 to RXm through a switch. The switch becomes the on-state in a time interval during which the signal of the corresponding receiving electrode RX is sensed, thereby allowing the receiver to sense the sensing signal from the receiving electrode RX. The receiver may include an amplifier (not shown) and a feedback capacitor coupled between the negative (−) input terminal of the amplifier and the output terminal of the amplifier, i.e., coupled to a feedback path. Here, the positive (+) input terminal of the amplifier may be connected to the ground. Also, the receiver may further include a reset switch which is connected in parallel with the feedback capacitor. The reset switch may reset the conversion from current to voltage that is performed by the receiver. The negative input terminal of the amplifier is connected to the corresponding receiving electrode RX and receives and integrates a current signal including information on the capacitance (CM) 101, and then converts the integrated current signal into voltage. The sensing unit 110 may further include an analog to digital converter (ADC) (not shown) which converts the integrated data by the receiver into digital data. Later, the digital data may be input to a processor (not shown) and processed to obtain information on the touch on the touch sensor panel 100. The sensing unit 110 may include the ADC and processor as well as the receiver.

A controller 130 may perform a function of controlling the operations of the drive unit 200 and the sensing unit 110. For example, the controller 130 generates and transmits a drive control signal to the drive unit 120, so that the drive signal can be applied to a predetermined drive electrode TX1 at a predetermined time. Also, the controller 130 generates and transmits the drive control signal to the sensing unit 110, so that the sensing unit 110 may receive the sensing signal from the predetermined receiving electrode RX at a predetermined time and perform a predetermined function.

In FIG. 1, the drive unit 120 and the sensing unit 110 may constitute a touch detection device (not shown) capable of detecting whether or not the touch has occurred on the touch sensor panel 100 of the touch input device 1000 and the touch position. The touch input device 1000 to which the touch pressure sensitivity correction method according to the embodiment is applied may further include the controller 130. In the embodiment of the present invention, the touch detection device according to the embodiment may be integrated and implemented on a touch sensing integrated circuit (IC) in a touch input device 1000 including the touch sensor panel 100. The drive electrode TX and the receiving electrode RX included in the touch sensor panel 100 may be connected to the drive unit 120 and the sensing unit 110 included in the touch sensing IC 150 through, for example, a conductive trace and/or a conductive pattern printed on a circuit board, or the like.

As described above, a capacitance (C) with a predetermined value is generated at each crossing of the drive electrode TX and the receiving electrode RX. When an object such as finger approaches close to the touch sensor panel 100, the value of the capacitance may be changed. In FIG. 1, the capacitance may represent a mutual capacitance (Cm). The sensing unit 110 senses such electrical characteristics, thereby being able to sense whether the touch has occurred on the touch sensor panel 100 or not and the touch position. For example, the sensing unit 110 is able to sense whether the touch has occurred on the surface of the touch sensor panel 100 comprised of a two-dimensional plane consisting of a first axis and a second axis and/or the touch position.

More specifically, when the touch occurs on the touch sensor panel 100, the drive electrode TX to which the drive signal has been applied is detected, so that the position of the second axial direction of the touch can be detected. Likewise, when the touch occurs on the touch sensor panel 100, a capacitance change is detected from the reception signal received through the receiving electrode RX, so that the position of the first axial direction of the touch can be detected.

The mutual capacitance type touch sensor panel as the touch sensor panel 100 has been described in detail in the foregoing. However, in the touch input device 1000, the touch sensor panel 100 for detecting whether or not the touch has occurred and the touch position may be implemented by using not only the above-described method but also any touch sensing method like a self-capacitance type method, a surface capacitance type method, a projected capacitance type method, a resistance film method, a surface acoustic wave (SAW) method, an infrared method, an optical imaging method, a dispersive signal technology, and an acoustic pulse recognition method, etc.

In the touch input device 1000 to which the touch pressure sensitivity correction method according to the embodiment is applied, the touch sensor panel 100 for detecting the touch position may be positioned outside or inside a display module 200.

The display module 200 of the touch input device 1000 may be a liquid crystal display (LCD). Here, the display module 200 may have any one of an In Plane Switching (IPS) type, a Vertical Alignment (VA) type, and a Twisted Nematic (TN) type. Also, the display module 200 of the touch input device 1000 may be a display panel included in a plasma display panel (PDP), an organic light emitting diode (OLED), etc. Accordingly, a user may perform the input operation by touching the touch surface while visually identifying an image displayed on the display panel.

Here, the display module 200 may include a control circuit which receives an input from an application processor (AP) or a central processing unit (CPU) on a main board for the operation of the touch input device 1000 and displays the contents that the user wants on the display panel.

Here, the control circuit for the operation of the display module 200 may include a display panel control IC, a graphic controller IC, and other circuits required to operate the display module 200.

Figure 2:
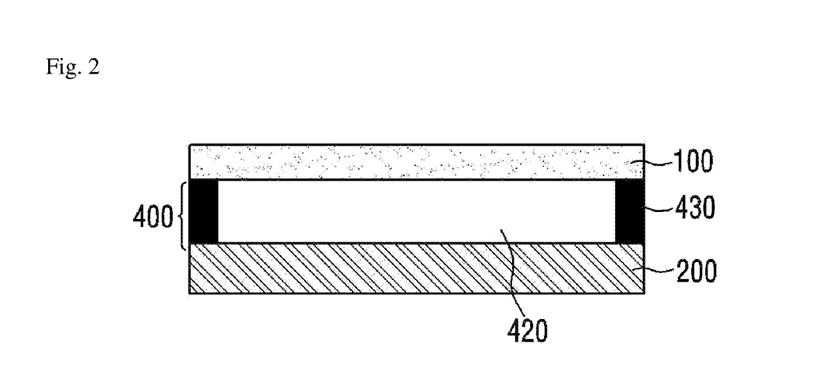
FIG. 2 is a cross sectional view of the touch input device configured to detect a touch position and a touch pressure, to which the touch pressure sensitivity correction method according to the embodiment of the present invention is applied.

FIG. 2 is a cross sectional view of the touch input device configured to detect the touch position and the touch pressure, to which the touch pressure sensitivity correction method according to the embodiment of the present invention is applied.

In the touch input device 1000 including the display module 200, a pressure detection module 400 and the touch sensor panel 100 which detects the touch position may be attached to the front side of the display module 200. Accordingly, it is possible to protect a display screen of the display module 200 and to increase a touch detection sensitivity of the touch sensor panel 100.

Here, the pressure detection module 400 may operate separately from the touch sensor panel 100 which detects the touch position. For example, the pressure detection module 400 may detect only the pressure independently of the touch sensor panel 100 which detects the touch position. Also, the pressure detection module 400 may be configured to be coupled to the touch sensor panel 100 which detects the touch position and to detect the touch pressure. For example, at least one of the drive electrode TX and the receiving electrode RX included in the touch sensor panel 100 which detects the touch position may be used to detect the touch pressure.

FIG. 2 shows that the pressure detection module 400 is coupled to the touch sensor panel 100 and detects the touch pressure. In FIG. 2, the pressure detection module 400 includes a spacer layer 420 which leaves a space between the touch sensor panel 100 and the display module 200. The pressure detection module 400 may include a reference potential layer spaced from the touch sensor panel 100 by the spacer layer 420. Here, the display module 200 may function as the reference potential layer.

The reference potential layer may have any potential which causes the change of the capacitance 101 generated between the drive electrode TX and the receiving electrode RX. For instance, the reference potential layer may be a ground layer having a ground potential. The reference potential layer may be the ground layer of the display module 200. Here, the reference potential layer may have a parallel plane with the two-dimensional plane of the touch sensor panel 100.

As shown in FIG. 2, the touch sensor panel 100 is disposed apart from the display module 200, i.e., the reference potential layer. Here, depending on a method for adhering the touch sensor panel 100 to the display module 200, the spacer layer 420 between the touch sensor panel 100 and the display module 200 may be implemented in the form of an air gap.

Here, a double adhesive tape (DAT) 430 may be used to fix the touch sensor panel 100 and the display module 200. For example, the areas the touch sensor panel 100 and the display module 200 are overlapped with each other. The touch sensor panel 100 and the display module 200 are adhered to each other by adhering the edge portions of the touch sensor panel 100 and the display module 200 through use of the DAT 430. The rest portions of the touch sensor panel 100 and the display module 200 may be spaced apart from each other by a predetermined distance "d".

In general, even when the touch surface is touched without bending the touch sensor panel 100, the capacitance (Cm) 101 between the drive electrode TX and the receiving electrode RX is changed. That is, when the touch occurs on the touch sensor panel 100, the mutual capacitance (Cm) 101 may become smaller than a base mutual capacitance. This is because, when the conductive object like a finger approaches close to the touch sensor panel 100, the object functions as the ground GND, and then a fringing capacitance of the mutual capacitance (Cm) 101 is absorbed in the object. The base mutual capacitance is the value of the mutual capacitance between the drive electrode TX and the receiving electrode RX when there is no touch on the touch sensor panel 100.

When the object touches the top surface, i.e., the touch surface of the touch sensor panel 100 and a pressure is applied to the top surface, the touch sensor panel 100 may be bent. Here, the value of the mutual capacitance (Cm) 101 between the drive electrode TX and the receiving electrode RX may be more reduced. This is because the bend of the touch sensor panel 100 causes the distance between the touch sensor panel 100 and the reference potential layer to be reduced from "d" to "d'", so that the fringing capacitance of the mutual capacitance (Cm) 101 is absorbed in the reference potential layer as well as in the object. When a nonconductive object touches, the change of the mutual capacitance (Cm) 101 is simply caused by only the change of the distance "d-d'" between the touch sensor panel 100 and the reference potential layer.

As described above, the touch input device 1000 is configured to include the touch sensor panel 100 and the pressure detection module 400 on the display module 200, so that not only the touch position but also the touch pressure can be simultaneously detected.

However, as shown in FIG. 2, when the pressure detection module 400 as well as the touch sensor panel 100 is disposed on the display module 200, the display properties of the display module is deteriorated. Particularly, when the air gap 420 is included on the display module 200, the visibility and optical transmittance of the display module may be lowered.

Accordingly, in order to prevent such problems, the air gap is not disposed between the display module 200 and the touch sensor panel 100 for detecting the touch position. Instead, the touch sensor panel 100 and the display module 200 can be fully laminated by means of an adhesive like an optically clear adhesive (OCA).

In the description related to FIGS. 1 and 2, the configuration of the touch input device 1000 to which the touch pressure sensitivity correction method according to the embodiment of the present invention is applied has been specified in order to describe the principle of detecting the touch position and the touch pressure. However, the touch pressure sensitivity correction method according to the embodiment of the present invention can be applied to any touch input device which is capable of the touch pressure and has a different structure from those shown in FIGS. 1 and 2.

As described above, the pressure detection is made based on the distance change between the electrodes, furthermore, the capacitance change between the electrodes by the bending due to the application of a predetermined pressure to the touch sensor panel 100. However, how much the touch sensor panel 100 is bent cannot be the same at all the positions. Particularly, the edge of the touch sensor panel 100 is fixed to the case and is less bent than the central portion of the touch sensor panel 100 even if the same pressure is applied.

Figure 3A:
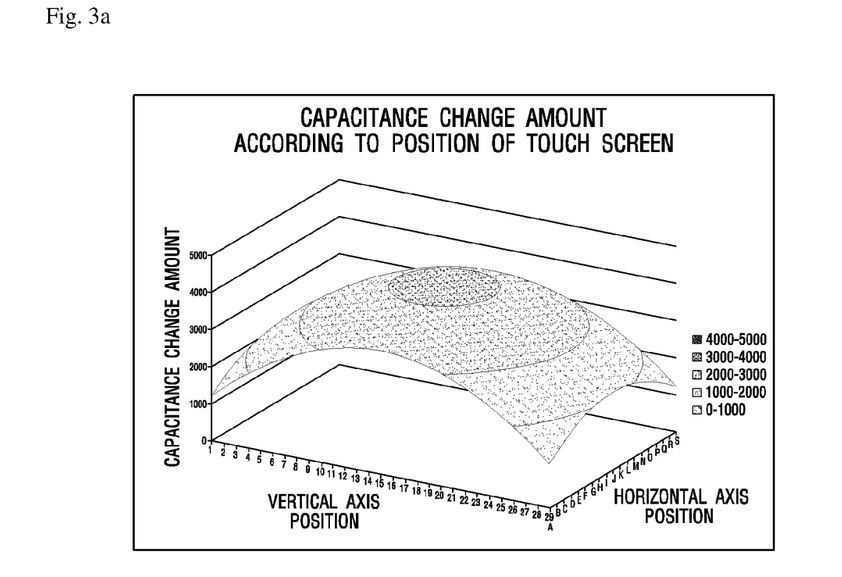
FIG. 3a is a graph showing a capacitance change amount which is sensed when the same pressure is applied to each position of a touch sensor panel.

FIG. 3a is a graph showing a capacitance change amount which is sensed when the same pressure is applied to each position of such a touch sensor panel 100. In the graph of FIG. 3a, an x-axis and a y-axis represent a horizontal axis position and a vertical axis position respectively. A z-axis represents the sensed capacitance change amount. As shown in FIG. 3a, when the same pressure is applied, the capacitance change amount varies depending on the position. The central portion of the touch sensor panel 100 has a large capacitance change amount. The capacitance change amount decreases toward the edge of the touch sensor panel 100.

Figure 3B:
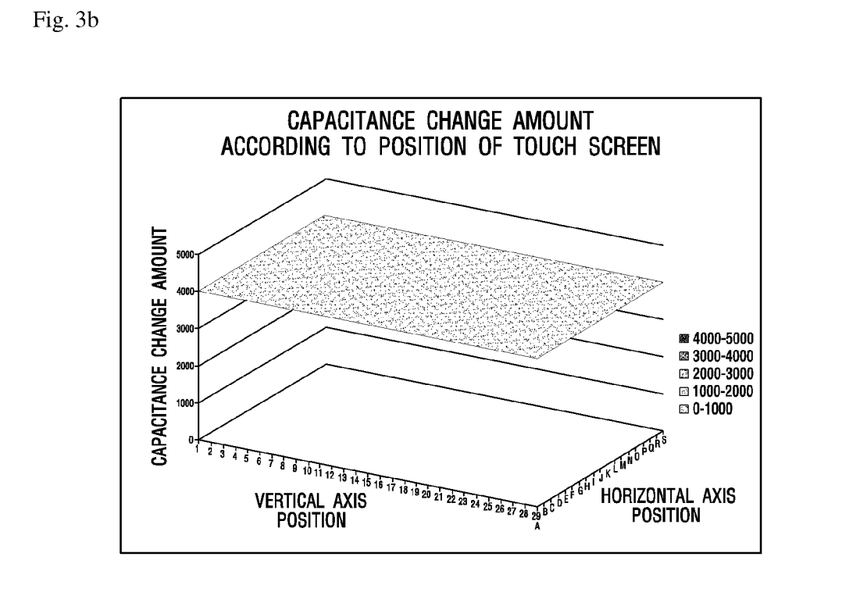
FIG. 3b is a graph showing a preferable capacitance change amount.

This means that the edge of the touch sensor panel 100 has a lower sensitivity than that of the central portion of the touch sensor panel 100. This is an unavoidable problem in the manufacturing process and structure of the touch input device 1000. Ideally, as shown in FIG. 3b, it is preferable for all the areas of the touch sensor panel 100 to have the same sensitivity. Therefore, the present invention provides the touch pressure sensitivity correction method which allows the capacitance change amount sensed at all the positions of the touch sensor panel 100 to be, as shown in FIG. 3b, uniform through the touch pressure sensitivity correction.

Figure 4:
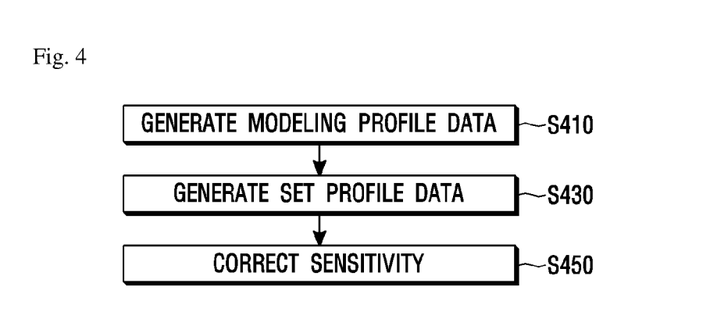
FIG. 4 is a flowchart showing the touch pressure sensitivity correction method according to the embodiment of the present invention.

FIG. 4 is a flowchart showing the touch pressure sensitivity correction method according to the embodiment of the present invention.

Referring to FIG. 4, the touch pressure sensitivity correction method according to the embodiment of the present invention includes a step S410 of generating modeling profile data, a step S430 of generating set profile data, and a step S450 of correcting the sensitivity.

Figure 5:
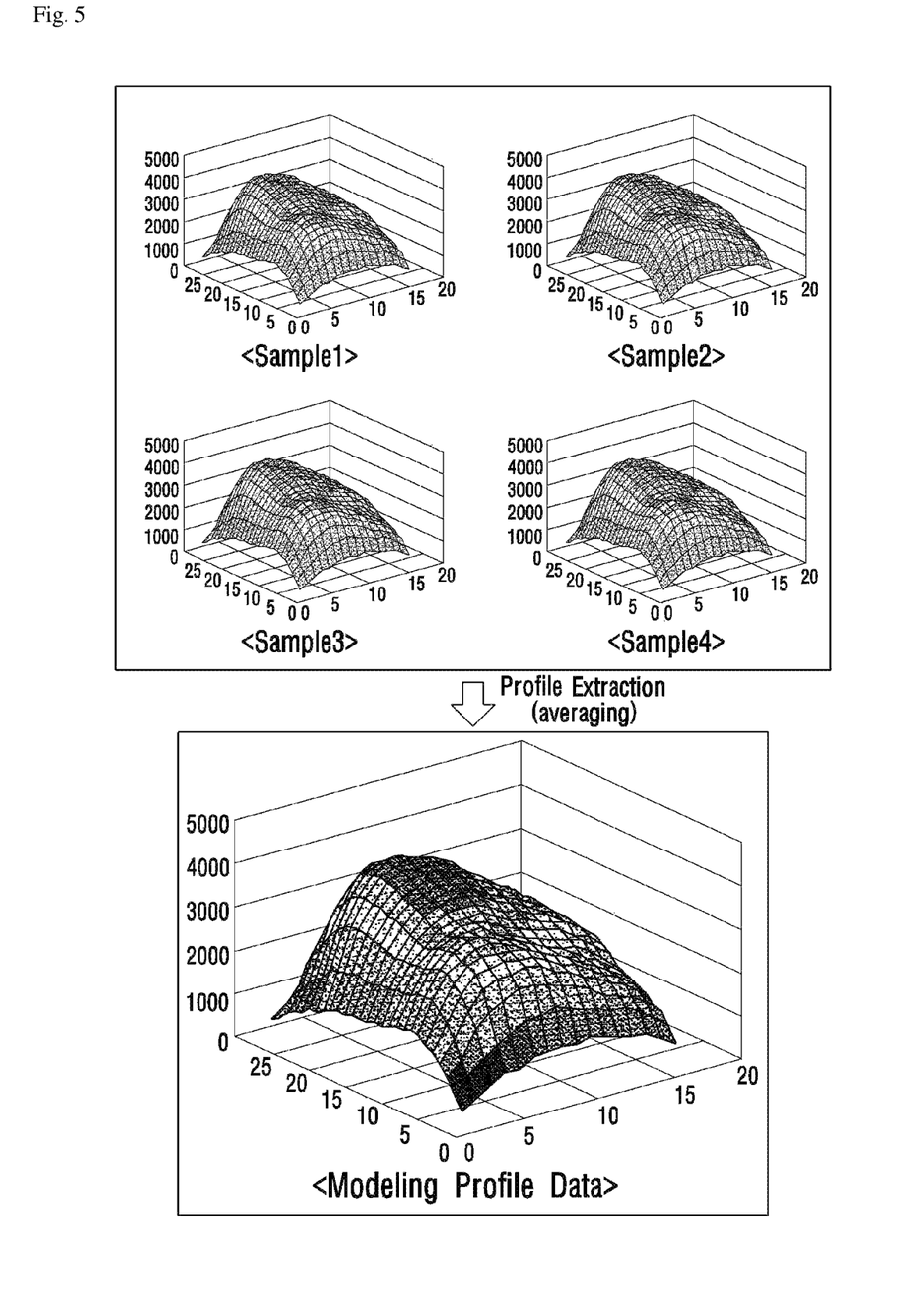
FIG. 5 is a view for describing a method for generating modeling profile data.

Reference is made to FIG. 5 to describe the step S410 of generating the modeling profile data.

FIG. 5 is a view for describing a method for generating the modeling profile data.

Referring to FIG. 5, as shown on the left side of FIG. 5, profile data on the capacitance change amount of each of any plurality of selected touch sensor panels (sample 1, sample 2, sample 3, and sample 4) are collected.

In the left graph of FIG. 5, the x-axis and y-axis at the bottom mean respective axes of the display surface of the touch input device, and the z-axis means the capacitance change amount detected by applying the same pressure to the display surface of the touch input device.

The figure of the left of FIG. 5 shows four profile data, i.e., four profile data obtained from four touch input devices. In addition, a greater or smaller number of profile data that this can be also used.

As shown in the figure of the right of FIG. 5, the modeling profile data is generated by using the four profile data (sample 1, sample 2, sample 3, and sample 4) shown on the left of FIG. 5. The modeling profile data can be generated by calculating the average value of the four profile data.

Other methods for generating the modeling profile data include a low level feature extraction method such as curvature detection algorithm, edge detection algorithm, etc., a shape matching method such as template matching algorithm, Hough transform algorithm, etc., and a flexible shape extraction method such as deformable templates algorithm, Snakes algorithm, etc. However, this is just an example, and the modeling profile data can be generated by various methods other than this.

The generated modeling profile data can be not only a balancing value for each of the four touch input devices (sample 1, sample 2, sample 3, and sample 4) shown on the left of the FIG. 5 but also a balancing value for numerous touch input devices which have the same internal structure as those of the four touch input devices shown on the left of the FIG. 5 and are produced through the same manufacturing process as those of the four touch input devices shown on the left of the FIG. 5.

Referring back to FIG. 4, when the modeling profile data is generated (S410), set profile data is generated (S430). The set profile data is for correcting the touch pressure sensitivity of the manufactured touch input device. Numerous touch input devices which have the same internal structure and are produced through the same manufacturing process do not have the same touch pressure sensitivity. For this reason, the set profile data is generated for each touch input device by using the modeling profile data generated in the step S410 and then the touch pressure sensitivity is corrected for each touch input device.

The set profile data is generated for each of the four touch input devices (sample 1, sample 2, sample 3, and sample 4) shown on the left of the FIG. 5 and is generated for each of numerous touch input devices which have the same internal structure as those of the four touch input devices shown on the left of the FIG. 5 and are produced through the same manufacturing process as those of the four touch input devices shown on the left of the FIG. 5.

Hereinafter, a method for generating the set profile data of a "predetermined touch input device" will be described in detail with reference to FIG. 6. Here, the "predetermined touch input device" may be any one of the four touch input devices (sample 1, sample 2, sample 3, and sample 4) shown on the left of the FIG. 5 or may be any one of numerous touch input devices which have the same internal structure as those of the four touch input devices shown on the left of the FIG. 5 and are produced through the same manufacturing process as those of the four touch input devices shown on the left of the FIG. 5.

Figure 6:
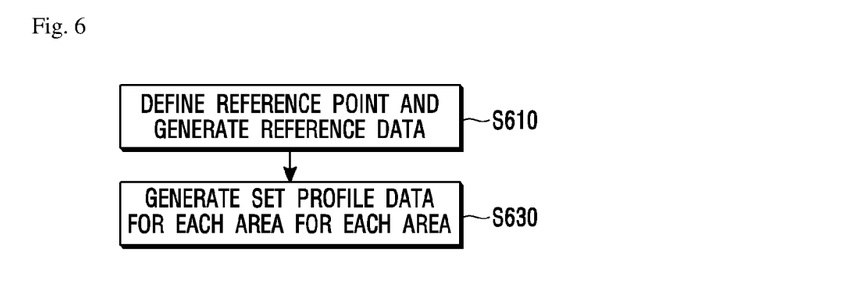
FIG. 6 is a flowchart for describing a method for generating set profile data shown in FIG. 4.

FIG. 6 is a flowchart for describing a method for generating the set profile data shown in FIG. 4.

Referring to FIG. 6, the method for generating the set profile data S430 shown in FIG. 4 includes a step S610 of defining a reference point and of generating reference data, and a step S630 of generating the set profile data for each area.

The step S610 of defining a reference point and of generating reference data can be designated as a step of defining a calibration pointer and of generating calibration pointer data.

The method for defining a reference point can be performed by defining a plurality of reference points on the display surface of the predetermined touch input device. Imaginary horizontal lines and imaginary vertical lines are set on the display surface of the predetermined touch input device, and then a reference point can be defined by being located at the intersection of the horizontal line and the vertical line. Here, it is desirable that two or more horizontal lines and the vertical lines should be provided. Therefore, four or more reference points can be defined. A lot of time and cost is required to perform a test and calibration at all positions of the display surface of the touch input device after the input device is produced. Therefore, after measuring the capacitance change amount only at several reference points (15 reference points in the embodiment) without performing a test and calibration at all positions of the display surface of the produced touch input device, the reference points are defined in order to estimate the characteristics of the remaining points by using the 15 measured values.

Figure 7:
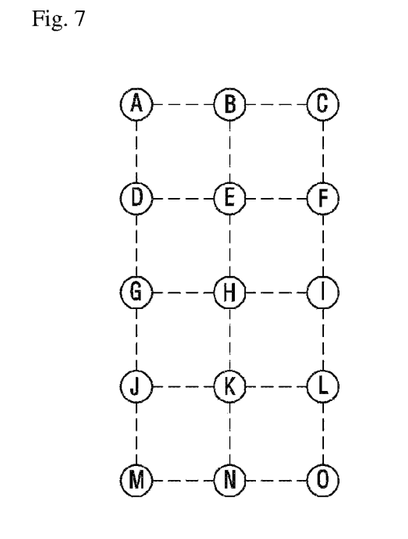
FIG. 7 shows that a total of 15 reference points from A to O are defined at points where five horizontal lines and three vertical lines cross.

An example of the defined reference point is shown in FIG. 7. In FIG. 7, dotted lines correspond to the above-described horizontal line or vertical line, and circles marked with alphabets represent the defined reference points.

FIG. 7 shows that a total of 15 reference points from "A" to "O" are defined at the intersections of five horizontal lines and three vertical lines. Sure enough, a greater or smaller number of reference points than this can be defined. However, for convenience of description and understanding, the following description will be provided by assuming that a total of 15 reference points shown in FIG. 7 are defined.

When the reference data is defined, a predetermined pressure is applied to the position where the reference data exists. Here, it is preferable that the pressure to be applied should have a similar magnitude to that of a human finger. When the same pressure is applied to each reference point, the capacitance change amount for the applied pressure is detected. Since the detection of the capacitance change amount has been described above, the description thereof will be omitted.

The detected capacitance change amount for each reference point is used to generate the reference data. For example, when the 15 reference points are, as shown in FIG. 7, defined, the capacitance change amounts for the reference points from "A" to "O" are recorded in the reference data. The reference data includes the capacitance change amount (z) and the position (x, y) of each reference point.

Again, the step S630 of generating the set profile data for each area will be described with reference to FIG. 6.

The display surface of the touch input device is divided into a center area and other remaining areas (an edge area and a corner area) and the set profile data is generated in different ways for each area.

The set profile data of the reference point located within the center area is generated by adding a deviation value which is a difference between the capacitance change amount of the reference point recorded in the reference data and the capacitance change amount of the reference point recorded in the modeling profile data to the capacitance change amount of the reference point recorded in the modeling profile data.

A deviation value of the capacitance change amount of each of the plurality of reference points adjacent to a random point Pc is calculated. A deviation value of the capacitance change amount of the random point Pc is calculated by using a linear interpolation and the calculated deviation value of the capacitance change amount of each of the plurality of reference points. The calculated deviation value of the capacitance change amount of the random point Pc is added to the capacitance change amount of the random point Pc recorded in the modeling profile data. Through the above process, the set profile data of the random point Pc located within the center area is generated.

The set profile data of a random point Pe or Pcr located within the other areas (the edge area and the corner area) is calculated by multiplying the capacitance change amount of the random point Pe or Pcr recorded in the modeling profile data by a predetermined scaling factor. Here, the scaling factor is a ratio between the capacitance change amount recorded in the modeling profile data at one point of the center area which is the closest to the random point Pe or Pcr and the capacitance change amount recorded in the reference data at the one point. Here, the "one point" of the center area which is the closest to the random point Pe or Pcr may be the reference point or may be located between two reference points.

More specifically, the method for generating the set profile data will be described through examples with reference to FIGS. 8 to 13.

Figure 8:
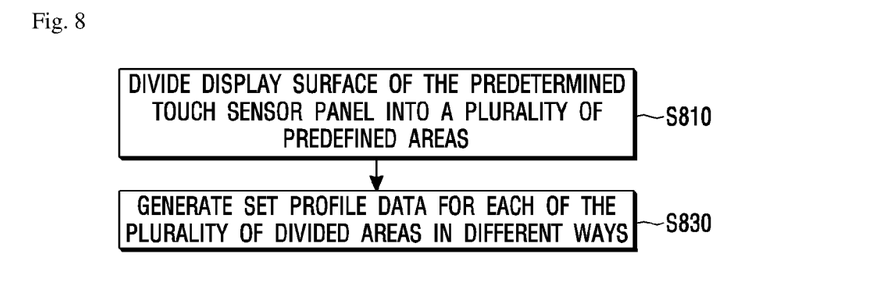
FIG. 8 is a flowchart for describing a step of generating the set profile data for each area shown in FIG. 6.

FIG. 8 is a flowchart for describing the step of generating the set profile data for each area shown in FIG. 6.

Referring to FIG. 8, the step S630 of generating the set profile data for each area includes a step S810 of dividing the display surface of the predetermined touch input device into a plurality of predefined areas, and a step S830 of generating the set profile data for each of the plurality of divided areas in different ways.

Figure 9:
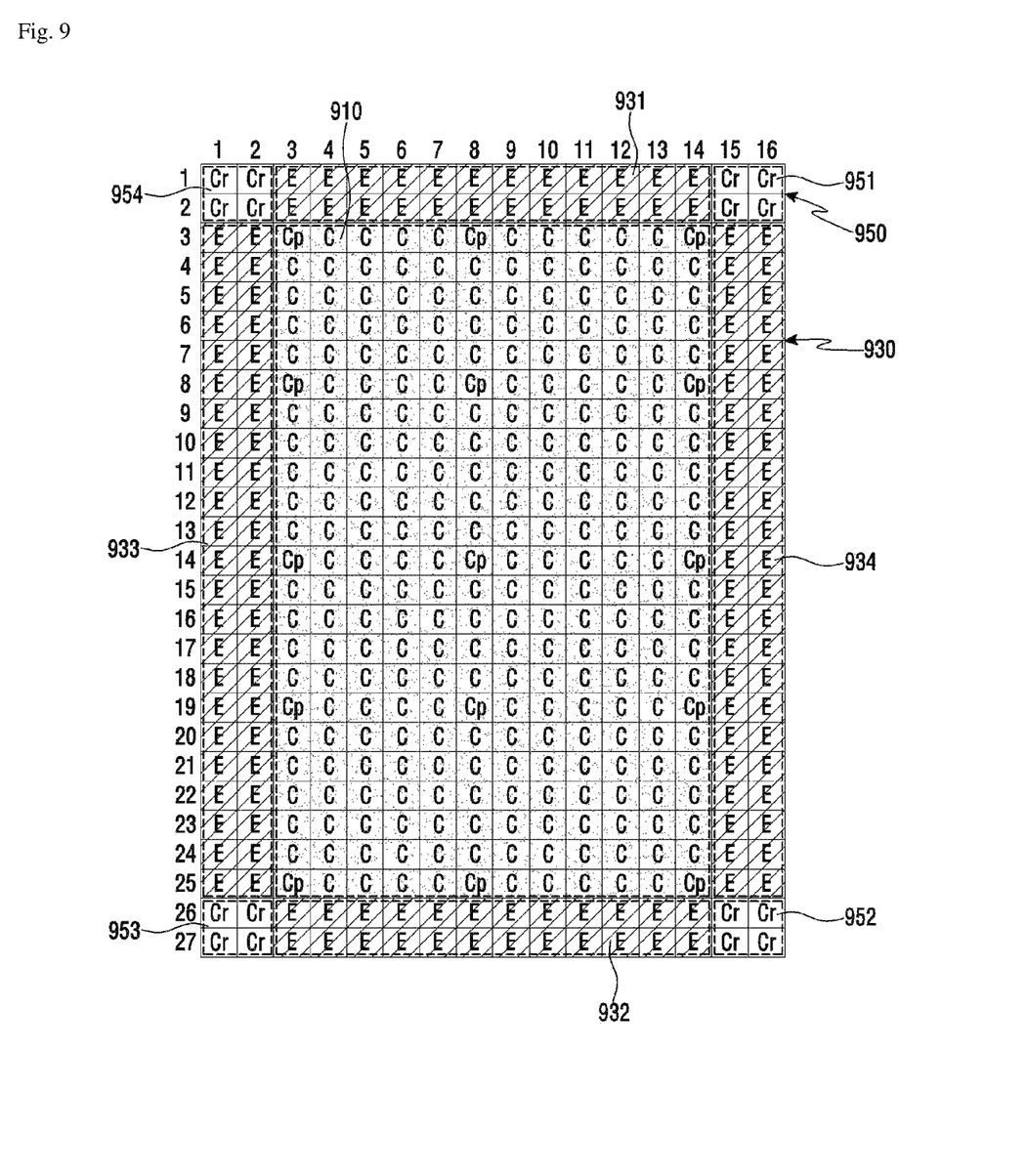
FIG. 9 is a view showing an example in which a display surface of a touch input device are divided into a plurality of predefined areas.

Reference is made to FIG. 9 to describe the step S810 of dividing the display surface of the predetermined touch input device into a plurality of predefined areas.

FIG. 9 is a view showing an example in which the display surface of the touch input device are divided into a plurality of predefined areas.

Referring to FIG. 9, the display surface of the predetermined touch input device is divided into three areas.

The display surface of the touch input device shown in FIG. 9 is divided into 432 pointers (27 horizontal pointers and 16 vertical pointers). 15 pointers out of 432 pointers correspond to the reference point, i.e., a calibration pointer Cp.

The three divided areas in FIG. 9 are the center area 910 including "Cp" and "C", the edge area 930 including "E", and the corner area 950 including "Cr".

The center area 910 includes the reference point (or calibration pointer, Cp). The center area 910 is defined by the plurality of reference points. The center area 910 is defined as a predetermined area formed by connecting imaginary lines connecting the outermost reference points among the plurality of reference points Cp. Within the center area 910, no reference point may be located, or one or more reference points may be located.

Also, the center area 910 includes a random point C. The random point c is located among the plurality of reference points Cp.

The edge area 930 and the corner area 950 are defined as remaining areas except for the center area 910 on the display surface of the touch input device.

The edge area 930 includes an upper area 931 located on the center area 910, a lower area 932 located under the center area 910, a left area 933 located on the left of the center area 910, and a right area 934 located on the right of the center area 910.

The corner area 950 is a remaining area except for the center area 910 and the edge area 930 on the display surface of the touch input device and is defined as an area located between two areas among the upper area 931, the lower area 932, the left area 933, and the right area 934. More specifically, the corner area 950 includes a first corner area 951 located between the upper area 931 and the right area 934, a second corner area 952 located between the right area 934 and the lower area 932, a third corner area 953 located between the lower area 932 and the left area 933, and a fourth corner area 954 located between the left area 933 and the upper area 931.

The edge area 930 and the corner area 950 include random points E and Cr.

Again, the step S830 of generating the set profile data for each of the plurality of divided areas in different ways will be described with reference to FIG. 8.

In the step S830 of generating the set profile data for each of the plurality of divided areas in different ways, the set profile data of the center area 910 shown in FIG. 9 and the set profile data of the edge area 930 and the corner area 950 are generated in different ways.

First, the method for generating the set profile data of the center area 910 shown in FIG. 9 will be described with reference to FIGS. 10 and 11.

Figure 10:
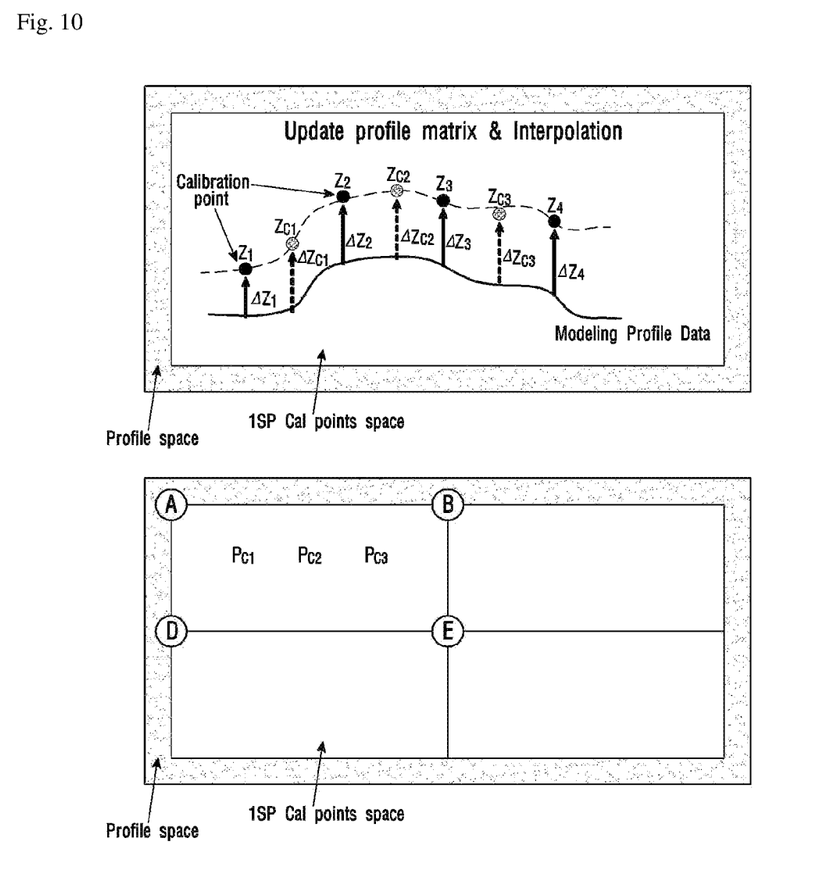
FIG. 10 is a view for describing a method for generating the set profile data of a center area 910 shown in FIG. 9.

FIG. 10 is a view for describing the method for generating the set profile data of the center area 910 shown in FIG. 9.

In FIG. 10, "A", "B", "D", and "E" correspond to the reference points A, B, D, and E shown in FIG. 7 and mean four adjacent reference points among the plurality of reference points Cp shown in FIG. 9. "Pc1", "Pc2", and "Pc3" correspond to random points located between the four reference points A, B, D, and E.

"z1" represents the capacitance change amount at the reference point A. "z2" represents the capacitance change amount at the reference point B. "z3" represents the capacitance change amount at the reference point D. "z4" represents the capacitance change amount at the reference point E. "z1", "z2", "z3", and "z4" are obtained from the previously generated reference data.

In order to generate the set profile data of the center area 910 shown in FIG. 9, first, the deviation values $\Delta z1$, $\Delta z2$, $\Delta z3$, and $\Delta z4$ of the respective reference points are calculated. The modeling profile data generated in the step S430 of FIG. 4 and the reference data generated in the step S610 of FIG. 6 are used to calculate the deviation value of the reference point. Data on the capacitance change amounts of all the reference points A, B, D, and E are recorded in the reference data and the modeling profile data respectively. The deviation value of each of the reference points is defined as a difference between the capacitance change amount of a specific reference point recorded in the reference data and the capacitance change amount of the specific reference point recorded in the modeling profile data. For a concrete example, the deviation value $\Delta z1$ of the reference point A is defined as a difference between the capacitance change amount z1 of the reference point A recorded in the reference data and the capacitance change amount z1 of the reference point A recorded in the modeling profile data.

The deviation values $\Delta z1$, $\Delta z2$, $\Delta z3$, and $\Delta z4$ of the respective reference points are calculated and the capacitance change amounts of random points Pc1, Pc2, and Pc3 located between the four reference points A, B, D, and E are calculated by using the calculated deviation values of the respective reference points and the linear interpolation.

The linear interpolation for calculating the capacitance change amounts of the random points Pc1, Pc2, and Pc3 located between the four reference points A, B, D, and E will be described with reference to FIG. 11.

Figure 11:
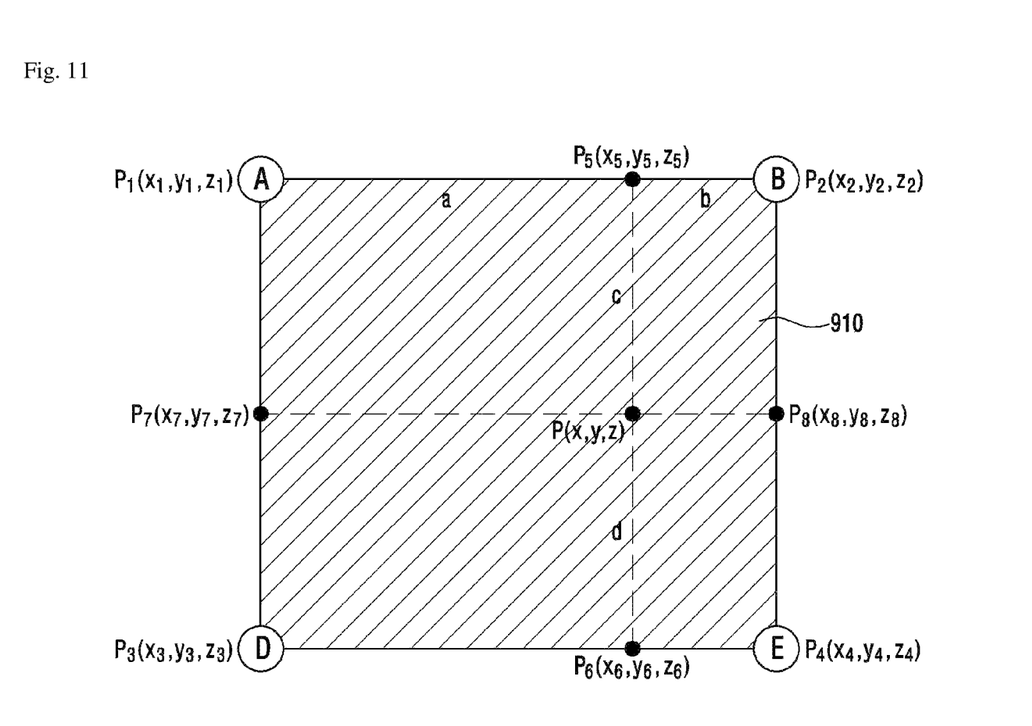
FIG. 11 is a view for describing a linear interpolation for calculating capacitance change amounts of random points Pc1, Pc2, and Pc3 shown in FIG. 10.

FIG. 11 is a view for describing the linear interpolation for calculating the capacitance change amounts of the random points Pc1, Pc2, and Pc3 shown in FIG. 10.

In FIG. 11, "A", "B", "D", and "E" correspond to the four reference points A, B, D, and E shown in FIG. 10. P(x, y, z) is a random point between the four reference points A, B, D, and E and means any one of "Pc1", "Pc2", and "Pc3" shown in FIG. 10.

Referring to FIG. 11, the capacitance change amount z of a random point P can be calculated through the following process.

First, the capacitance change amount z5 of a point P5 and the capacitance change amount z6 of a point P6 are estimated by the linear interpolation. Here, the point P5 is a foot of perpendicular from the random point P to an imaginary straight line connecting the reference point A with the reference point B. The point P6 is a foot of perpendicular from the random point P to an imaginary straight line connecting the reference point D with the reference point E.

The capacitance change amount z5 of the point P5 located between the reference point A and the reference point B can be linearly estimated by a ratio (a:b) of a straight-line distance between the point P5 and the reference point A to a straight-line distance between the point P5 and the reference point B. The capacitance change amount z6 of the point P6 located between the reference point D and the reference point E can be linearly estimated by a ratio (a:b) of a straight-line distance between the point P6 and the reference point D to a straight-line distance between the point P6 and the reference point E.

Next, after the capacitance change amount z5 of the point P5 and the capacitance change amount z6 of the point P6 are estimated by the linear interpolation, the capacitance change amount z of the random point P located between the point P5 and the point P6 is estimated by the linear interpolation. Here, the capacitance change amount z of the random point P can be linearly estimated by a ratio (c:d) of a distance between the random point P and the point P5 to a distance between the random point P and the point P6.

On the contrary, the capacitance change amount z7 of a point P7 and the capacitance change amount z8 of a point P8 are estimated by the linear interpolation, and then the capacitance change amount z of the random point P can be estimated by the linear interpolation through use of the estimated capacitance change amount z7 of the point P7 and the estimated capacitance change amount z8 of the point P8.

Meanwhile, without directly using "z1", "z2", "z3", and "z4", when the deviation values Δz1, Δz2, Δz3, and Δz4 calculated before "z1", "z2", "z3", and "z4" is replaced by the capacitance change amounts of the reference points A, B, D, and E, the deviation value of the capacitance change amount of the random point P can be estimated by the above-mentioned method.

Also, the set profile data of the random point P within the center area 910 can be generated by adding the calculated deviation value of the capacitance change amount of the random point P to the capacitance change amount of the random point P recorded in the modeling profile data.

In this way, the set profile data for all the random points P between the four reference points A, B, D, and E within the center area 910 can be generated.

Figure 12:
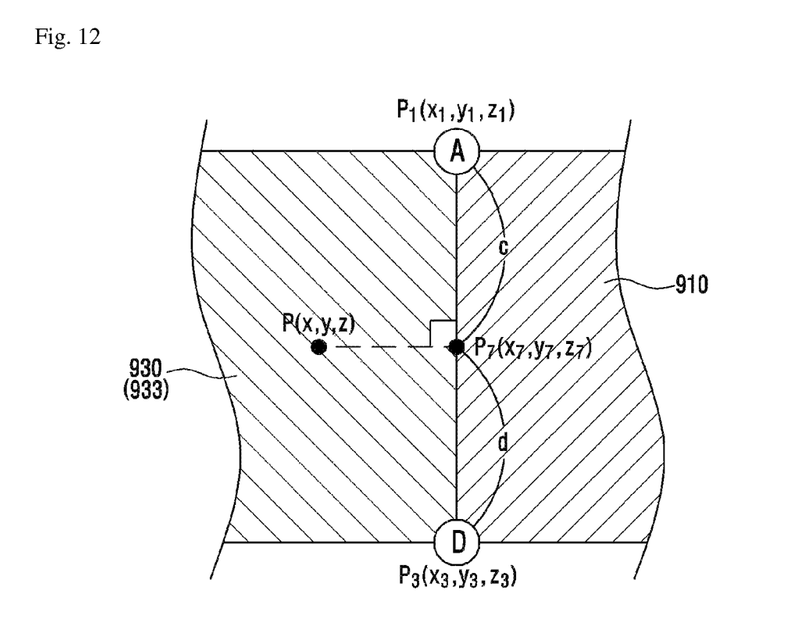
FIG. 12 is a view for describing a method for generating the set profile data of an edge area 930 shown in FIG. 9.

Again, the method for generating the set profile data of the edge area 930 will be described with reference to FIG. 9. Reference is made to FIG. 12 to describe the method for generating the set profile data of the edge area 930.

FIG. 12 is a view for describing the method for generating the set profile data of the edge area 930 shown in FIG. 9.

In FIG. 12, "A" and "D" are reference points. "P7" is a point within the center area 910 located between the reference point A and the reference point D. "P" is a random point located within the edge area 930, and more particularly, within the left area 933 of FIG. 9.

Referring to FIG. 12, in order to generate the set profile data of the random point P within the edge area 930, first, the capacitance change amount z7 of the point P7 within the center area 910, which is the closest to the random point P, is estimated. Specifically, the capacitance change amount z7 of the point P7 located between the reference point A and the reference point D is linearly estimated by a ratio (c:d) of a straight-line distance between the point P7 and the reference point A to a straight-line distance between the point P7 and the reference point D.

Here, the deviation value of the capacitance change amount of the point P7 between the reference point A and the reference point D can be estimated by substituting the previously calculated deviation values Δz1 and Δz3 into z1 and z3.

The set profile data of the point P7 can be generated by adding the estimated deviation value of the capacitance change amount of the point P7 to the capacitance change amount of the point P7 recorded in the modeling profile data.

Also, the capacitance change amount z7 of the point P7 can be obtained from the previously calculated set profile data of the center area 910 because the point P7 is included in the center area 910.

The capacitance change amount z of the random point P within the edge area 930 is calculated by multiplying the capacitance change amount of the random point P recorded in the modeling profile data by a scaling factor.

Here, the scaling factor is a ratio between the capacitance change amount recorded in the modeling profile data at one point within the center area 910, i.e., the point P7, which is the closest to the random point P within the edge area 930 and the capacitance change amount recorded in the reference data at the point P7. Specifically, the scaling factor may be a value obtained by dividing the capacitance change amount of the point P7 recorded in the modeling profile data by the capacitance change amount of the point P7 recorded in the reference data, or may be a value obtained by dividing the capacitance change amount of the point P7 recorded in the reference data by the capacitance change amount of the point P7 recorded in the modeling profile data.

The set profile data of the random point P within the edge area 930 can be generated by multiplying the capacitance change amount of the random point P recorded in the modeling profile data by the calculated scaling factor.

Figure 13:
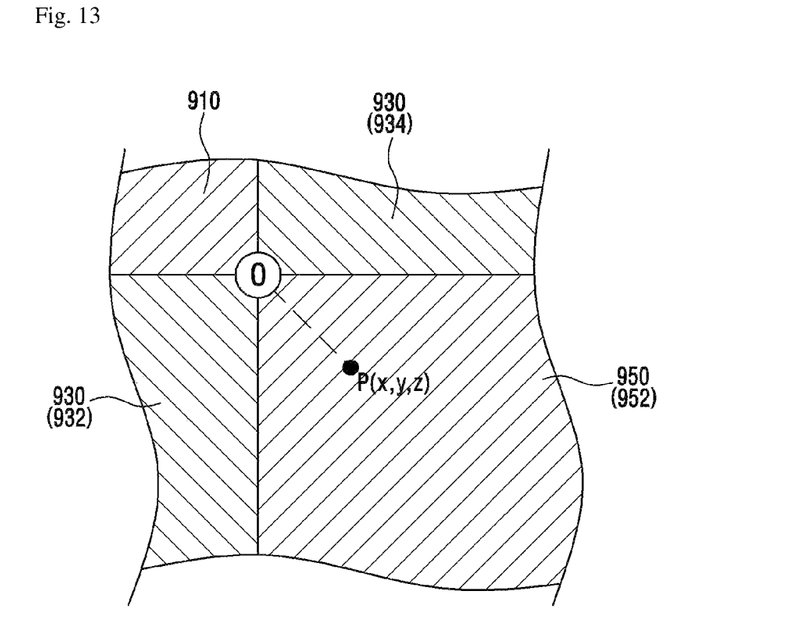
FIG. 13 is a view for describing a method for generating the set profile data of a corner area 950 shown in FIG. 9.

Again, the method for generating the set profile data of the corner area 950 will be described with reference to FIG. 9. Reference is made to FIG. 13 to describe the method for generating the set profile data of the corner area 950.

FIG. 13 is a view for describing the method for generating the set profile data of the corner area 950 shown in FIG. 9.

In FIG. 13, "O" represents the reference point. "P" represents a random point located within the corner area 950, more specifically, within the second corner area 952 of FIG. 9.

Referring to FIG. 13, in order to generate the set profile data of the random point P within the corner area 950, the scaling factor at the reference point O among the plurality of reference points which is the closest to the random point P is calculated. The scaling factor at the reference point O is defined as a ratio between the capacitance change amount of the reference point O recorded in the modeling profile data and the capacitance change amount of the reference point O recorded in the reference data. Specifically, the scaling factor may be a value obtained by dividing the capacitance change amount of the reference point O recorded in the modeling profile data by the capacitance change amount of the reference point O recorded in the reference data, or may be a value obtained by dividing the capacitance change amount of the reference point O recorded in the reference data by the capacitance change amount of the reference point O recorded in the modeling profile data.

When the scaling factor at the reference point O among the plurality of reference points which is the closest to the random point P is calculated, the set profile data of the random point P within the corner area 950 can be generated by multiplying the capacitance change amount of the random point P recorded in the modeling profile data by the calculated scaling factor.

Again, the sensitivity correction step S450 will be described with reference to FIG. 4.

When the set profile data is generated S430, the sensitivity correction step S450 is performed.

In the sensitivity correction step S450, a correction factor for all the points including the defined reference point and a random point is calculated and the calculated correction factor is multiplied to the capacitance change amount corresponding to the position of each point. As a result, the finally detected capacitance change amount becomes to have an overall uniform value.

Here, the correction factor may be an inverse number of the capacitance change amount recorded in the set profile data. Alternatively, the correction factor may be a value obtained by multiplying the inverse number of the capacitance change amount recorded in the set profile data by a predetermined target value. For example, when the target value is 3000 and the capacitance change amount (detected by directly applying the pressure) at the reference point A is 962, the correction factor at the reference point A may be 1/962 or may be 3000/962 obtained by multiplying 1/962 by the target value. Also, when the target value is 3000 and the capacitance change amount at a random point x is 1024, the correction factor at the random point x may be 1/1024 or may be 3000/1024 obtained by multiplying 1/1024 by the target value.

As such, according to the touch pressure sensitivity correction method according to the embodiment of the present invention, the set profile data is generated by using the modeling profile data and the reference data. Here, the display surface of the touch input device are divided into a plurality of areas, and the set profile data is generated for each divided areas in different ways. Then, the touch pressure sensitivity is corrected by using the generated set profile data. Therefore, uniform pressure sensitivity can be achieved over the entire display surface of the touch input device. In particular, the correction can be made such that continuous sensitivity is obtained at the boundary between the center area and the edge area, the boundary between the center area and the corner area, the boundary between the edge area and the corner area.

Meanwhile, the present invention may be implemented in the form of a computer-readable recording medium which records a program performing each of the steps included in the above-described touch pressure sensitivity correction method.

The program instruction which is recorded in the computer readable recording medium may be specially designed and configured for the present invention or may be well-known and available to those skilled in the field of computer software.

The computer-readable recording medium may include a hardware device, for example, a magnetic medium such as a hard disk, a floppy disk, and a magnetic tape, an optical recording medium such as CD-ROM, DVD, a magneto-optical medium such as a floptical disk, and ROM, RAM, flash memory, etc., which is especially configured to store and perform program instructions.

The program instruction may include not only a machine language code which is formed by a compiler but also high-level language code which can be executed by a computer using an interpreter, etc.

The hardware device may be configured to operate as one or more software modules in order to perform the process according to the present invention, and vice versa.

The features, structures and effects and the like described in the embodiments are included in one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A method for correcting a touch pressure sensitivity, the method comprising:
   a modeling profile data generation step of generating modeling profile data on the basis of a plurality of collected profile data;
   a reference data generation step of (1) defining a plurality of reference points on a display surface of a predetermined touch input device and (2) generating reference data comprising an electrical characteristic change amount at a position of each of the plurality of reference points; and
   a set profile data generation step of generating set profile data on the basis of the modeling profile data and the reference data of the predetermined touch input device;
   wherein the set profile data is generated for each area by dividing the display surface of the predetermined touch input device into two or more plural areas and generating the set profile data for each of the plural areas in different ways.

2. The method of claim 1, wherein, in the modeling profile data generation step, the modeling profile data is generated by calculating an average value of the plurality of collected profile data.

3. The method of claim 1, wherein, in the step of generating the set profile data for each area,
   the display surface of the predetermined touch input device is divided into a center area and a remaining area, and the center area is formed by connecting imaginary lines connecting the outermost reference points among the plurality of reference points,
   the set profile data of the reference point located within the center area is generated by adding a deviation value which is a difference between the electrical characteristic change amount of the reference point recorded in the reference data and the electrical characteristic change amount of the reference point recorded in the modeling profile data to the electrical characteristic change amount of the reference point recorded in the modeling profile data,
   and the set profile data of a random point located within the center area is generated by calculating a deviation value of the electrical characteristic change amount of each of the plurality of reference points adjacent to the random point, by calculating a deviation value of a electrical characteristic change amount of the random point by using a linear interpolation and the calculated deviation value of the electrical characteristic change amount of each of the plurality of reference points, and by adding the calculated deviation value of the electrical characteristic change amount of the random point to the electrical characteristic change amount of the random point recorded in the modeling profile data.

4. The method of claim 3, wherein the linear interpolation uses ratios of distances from the random point to the plurality of reference points.

5. The method of claim 1, wherein, in the step of generating the set profile data for each area, the display surface of the predetermined touch input device is divided into a center area and a remaining area, and the center area is formed by connecting imaginary lines connecting the outermost reference points among the plurality of reference points, the set profile data of a random point located within the remaining area is calculated by multiplying a electrical characteristic change amount of the random point recorded in the modeling profile data by a predetermined scaling factor, the scaling factor is a ratio between a electrical characteristic change amount recorded in the modeling profile data at one point of the center area which is the closest to the random point and a electrical characteristic change amount recorded in the reference data at the one point, and the one point of the center area is a reference point which is the closest to the random point or is a point located between two reference points.

6. The method of claim 5, wherein the scaling factor is a value obtained by dividing the electrical characteristic change amount recorded in the modeling profile data at the one point of the center area which is the closest to the random point by the electrical characteristic change amount recorded in the reference data, or a value obtained by dividing the electrical characteristic change amount recorded in the reference data at the one point of the center area which is the closest to the random point by the electrical characteristic change amount recorded in the modeling profile data.

7. The method of claim 1, further comprising a sensitivity correction step of correcting a sensitivity on the basis of the set profile data, and wherein, in the sensitivity correction step, a predetermined correction factor is multiplied to the electrical characteristic change amount within the set profile data.

8. The method of claim 7, wherein the correction factor is an inverse number of the electrical characteristic change amount recorded in the set profile data, or is a value obtained by multiplying the inverse number by a predetermined target value.

9. A computer-readable recording medium which records programs for executing the method for correcting a touch pressure sensitivity described in claim 1.

* * * * *